(12) United States Patent
Coltro

(10) Patent No.: US 6,822,956 B1
(45) Date of Patent: Nov. 23, 2004

(54) METHOD AND DEVICE FOR IMPROVING FLEXIBILITY AND TRANSPARENCY AT THE NODES OF SYNCHRONOUS HIERARCHY DATA TRANSPORT NETWORKS

(75) Inventor: Claudio Coltro, Cassina de Pecchi (IT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/332,138

(22) Filed: Jun. 14, 1999

(30) Foreign Application Priority Data

Jun. 16, 1998 (IT) ......................................... MI98A1366

(51) Int. Cl.[7] .............................................. H04L 12/56
(52) U.S. Cl. ...................................................... 370/389
(58) Field of Search ................................ 370/466, 118, 370/228, 223, 535, 360, 916, 474, 907, 539–541, 389

(56) References Cited

U.S. PATENT DOCUMENTS

| | | | |
|---|---|---|---|
| 5,359,600 A | * | 10/1994 | Ueda et al. |
| 5,956,347 A | * | 9/1999 | Slater |
| 6,005,699 A | * | 12/1999 | Tomooka |
| 6,011,802 A | * | 1/2000 | Norman |
| 6,049,525 A | * | 4/2000 | Takahashi |
| 6,058,119 A | * | 5/2000 | Engbersen |
| 6,061,329 A | * | 5/2000 | Abe |
| 6,169,754 B1 | | 1/2001 | Sugawara et al. |

FOREIGN PATENT DOCUMENTS

JP          09 321729 A       12/1997

OTHER PUBLICATIONS

ITU–T G.803 (06/97) Series G. Transmission Systems and Media, Digital Systems and Networks—Architecture of Transport Networks Based on the Synchronous Digital Hierarchy (SDH).
ITU–T G.707 (03/96) Series G Transmission Systems and Media—Network Node Interface for the Synchronous Digital Hierarchy.

* cited by examiner

*Primary Examiner*—Chi Pham
*Assistant Examiner*—Thai Hoang
(74) *Attorney, Agent, or Firm*—Sughrue Mion, PLLC

(57) ABSTRACT

A method and device for improving flexibility and transparency at the nodes of synchronous hierarchy data transport networks is disclosed. The method uses, as a network flexibility point, a Multiplex Section Digital Cross Connect MS-DXC and SDH or WDM terminals for mere transport need. The MSOH, and possibly RSOH, sections of the STM-N frame of the high bit-rate SDH signal are handled by the MS digital cross connect in a manner equivalent to the payload section thus providing transparency for the payload and for the MSOH section, as well as, possibly, for the RSOH section too.

9 Claims, 2 Drawing Sheets

US 6,822,956 B1

METHOD AND DEVICE FOR IMPROVING FLEXIBILITY AND TRANSPARENCY AT THE NODES OF SYNCHRONOUS HIERARCHY DATA TRANSPORT NETWORKS

TECHNICAL FIELD

The present invention relates to the field of synchronous hierarchy data transport networks and, more precisely, to a method and device for improving the flexibility and transparency in the high-speed frame transport at the nodes of synchronous digital hierarchy networks.

BACKGROUND ART

The need to increase the transport capability and the functional potentiality and therefore the flexibility of the synchronous hierarchy (SDH or SONET) networks but, at the same time, to keep down additional costs created by these higher requirements, is more and more stringent.

As it is known, e.g. from ITU-T Recommendation G.707, the synchronous hierarchy high-bit rate signal frame at STM-N level comprises a header section hereinafter called "overhead", and a payload section, formed by the so called virtual containers VC-N, hereinafter referred as "payload". The overhead section, in turn, comprises a section called "regeneration section", RSOH, and a section called "multiplex section", MSOH. Said sections are known and reference is made e.g. to said Recommendation for a detailed explanation of their structure and use.

It is known that the transport is carried out through the payload section whereby the continuity and the transparency at the network nodes is provided, and that can thus be passed through the nodes in the high-speed lines without being processed, while the RSOH and MSOH sections are used for other network functions and are terminated at the nodes themselves, i.e. they are read out in order to process them (to get e.g. performance measures or error rates relating to them) and they are re-written before being put again in the outgoing STM-N frames. It will be appreciated that such reading, processing, and rewriting operations may be referred in a more general sense as termination-type local reprocessing operations or, more simply, as local reprocessing operations.

A drawback, which is however observed, is that the transport capability based on the payload section of the frame may result to be insufficient for some needs.

Therefore, it is a first object of the present invention to overcome said drawback and to provide a method for providing the full transport continuity and transparency in the high-speed nodes of the network, according to which, in addition to the payload section, also the MSOH section, and further at least partially the RSOH section, are used; i.e. the MSOH section, and also part of the RSOH section, are passed through in the node points along with the payload without terminating them, also providing the full networking functionality, i.e. the capability of carrying out the OAM&P (operation, administration, maintenance and provisioning) functions of the transport network.

The network nodes supporting such new functionalities could be implemented through the use of known devices such as optical dividers, hereinafter called optical cross-connects, and WDM-type (Wavelength Division Multiplex) line systems.

The use of said optical cross-connects is however a very expensive solution, with a technology which is not consolidated and repeatable with enough reliability yet. Moreover, it is not possible to provide and measure the quality of transmitted service in terms of BER (Bit Error Rate).

Furthermore, in order to transmit the resulting SDH frames over the related optical wavelengths, it would be necessary to add further overhead information on said wavelengths, and this would be a further design complication.

Therefore, a further object of the present invention is to overcome the aforesaid drawbacks and to provide a novel device for implementing points of flexibility at the nodes of the synchronous hierarchy transport network using a digital divider, hereinafter called MS-DXC (Multiplex Section Digital Cross Connect), and SDH or WDM terminals for mere transport requirement. Both the MSOH and possibly the RSOH overhead sections are handled by the digital cross connect in a manner equivalent to the payload section, thus providing the transparency for the payload and for the MSOH section, as well as, potentially, for the RSOH section.

DISCLOSURE OF THE INVENTION

Therefore, in accordance with the present invention, a high-capacity network node comprises known high-capacity WDM and SDH terminals and a multiplex section digital cross-connect, MS-DXC, which connects the low-speed interfaces of said terminals and which allows the realisation of the distribution and grooming functions for local and pass-through traffic so that the traffic granularity handled by the node is in terms of SDH STM-N synchronous hierarchy sections and not lower, or PDH plesiochronous hierarchy e.g. at a bit rate of 565 or 140 Mb/s and not lower.

Hence, a further point of flexibility for the network using the RSOH frame section is implemented by means of a digital MS cross-connect for providing all the OAM&P functionalities, i.e. operation, administration, maintenance and provisioning functionalities, of the transport network that transmits the payload and the MSOH section in a transparent way.

In this way most of the, or also the whole, STM-N frame can be handled by higher network levels connected to the high-speed node.

In order to achieve such objects, the present invention provides a method and device for improving the flexibility, the transparency and the management in the high-speed frame transport at the nodes of a synchronous digital hierarchy network, as better described in the claims which form an integral part of the present description.

Further objects and advantages of the present invention will result in being clear from the following detailed description of an embodiment thereof and from the accompanying drawings attached merely by way of a non limiting example.

BEST MODE FOR CARRYING OUT THE INVENTION

Figure 1:
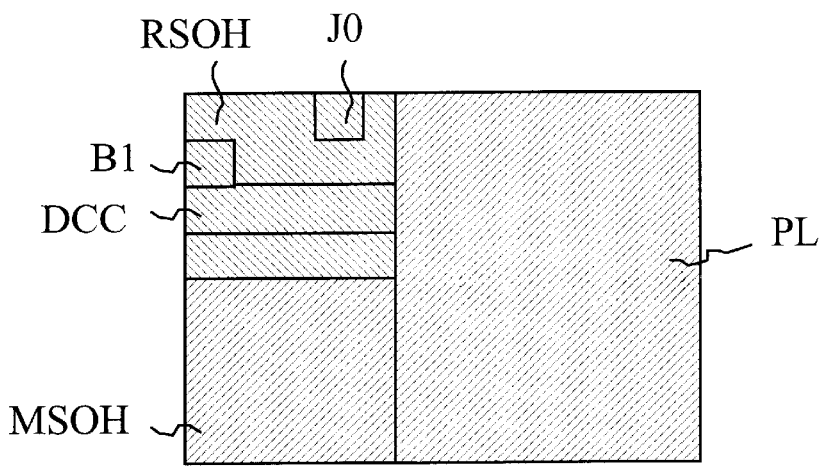
FIG. 1 shows a portion of the SDH signal frame called Synchronous Transport Module level N (STM-N)

In FIG. 1 there is illustrated a portion of the synchronous hierarchy (SDH or SONET) signal frame called STM-N (Synchronous Transport Module-level N), where for N=1 a basic level is obtained whose resulting bit rate is 155 Mb/s and for N=4, 16, 64 and so on, corresponding multiples are obtained. As it is known, a STM-N module consists of a section overhead SOH and a payload PL composed of the so-called virtual containers VC-N. The Section Overhead SOH is, in turn, composed of a Regeneration Section Overhead RSOH and a Multiplex Section Overhead MSOH.

Located in determined known areas of the RSOH are bytes such as JO, B1, DCC which, in accordance with the present invention, are used in a new manner to implement the following specific functionalities:

field JO performs the known regeneration section tracing out function and is used for connectivity management to check and identify the SCS (Single Channel System) optical ports in an intrusive manner, i.e. in such a way that at the node the field is read out, processed and re-written. In the new mode of operation in accordance with the present invention, the handling of byte JO can be intrusive, as above, or non-intrusive so that, in the node, such a byte is only read out and passed through, letting the central management system to process it as to monitor the connection status.

field B1 performs the known connection error rate checking function and is used for the performance monitoring function in an intrusive manner, i.e. in such a way that, at the node, the field is read out, processed and re-written. In the new mode of operation, in accordance with the present invention, the handling of the byte can be intrusive or non-intrusive so that, in the node, it is only read out letting the management system to process it as to monitor the end-to-end or the tandem connection (a known function described e.g. in the ITU-T Recommendation G.803).

fields D1–D3 (DCC) are used for implementing management functions in a known intrusive manner, i.e. they are read out, processed and re-written in the node. In the new mode of operation, in accordance with the present invention, the handling of said fields can be intrusive or non-intrusive so that a mere transparency pass-through function is implemented at the node: the handling of D1–D3 can be used for implementing an integrated data communication network (DCN) between the network nodes and the management system. An external DCN network could also be implemented to connect the nodes with the central management system. In this circumstance, the connection between the nodes and the DCN network is implemented through the management interface Q3 illustrated later on.

Therefore, according to the present invention, in order to facilitate the RSOH layer transparency in the node, the handling of at least a number of fields can become non intrusive, in addition to the already known intrusive handling: i.e. a sole read out and a mere pass-through of at least a portion of the RSOH field is carried out.

As an alternative, a full transparency of the whole RSOH field can be implemented for the SDH frames, leaving the entire RSOH field pass through in the node without intrusion. The sole read out of some fields of RSOH, like e.g. those described above, allows said OAM&P functions to be implemented in the nodes.

Figure 2:
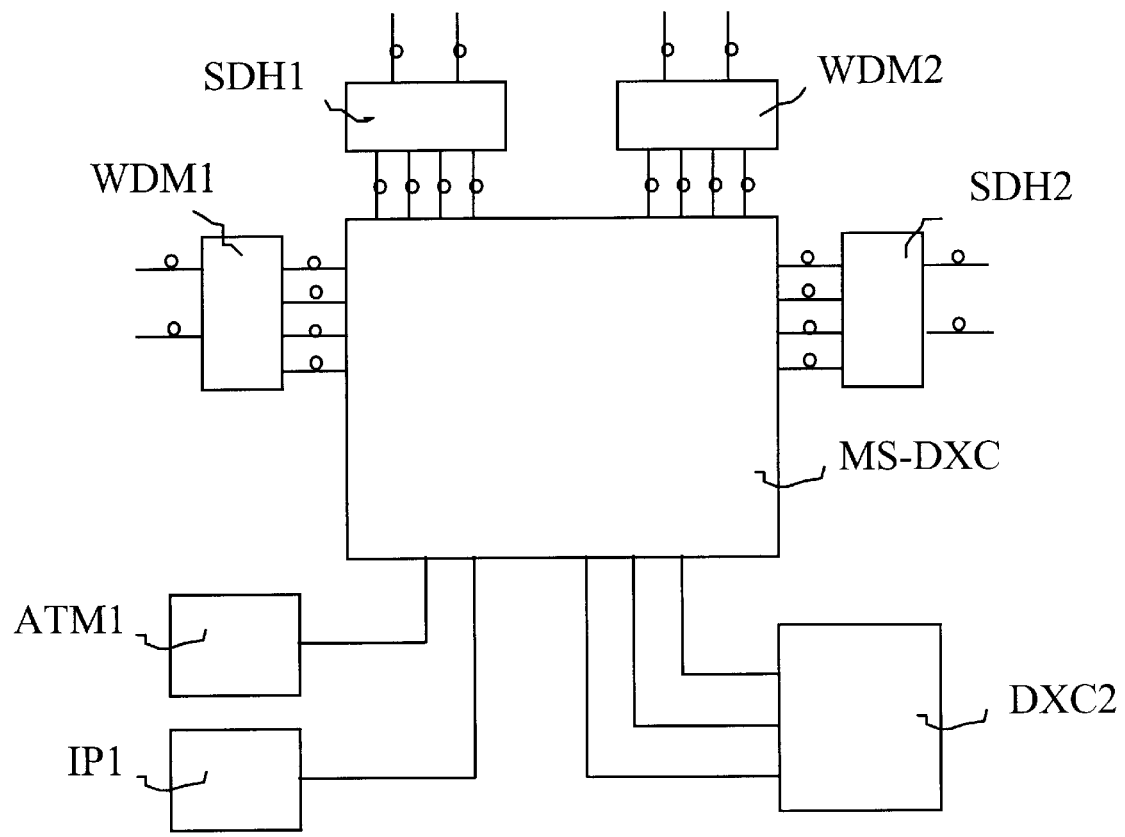
FIG. 2 illustrates a generic node of a high-capacity SDH network which features the present invention.

In FIG. 2 there is illustrated a generic node of a high capacity network, which is an embodiment of the present invention, comprising a non-blocking digital cross-connect MS-DXC. Connected in a known manner to MS-DXC are:

common high-capacity WDM and SDH terminals for the high speed traffic management;

interfaces for the local traffic management, e.g. towards ATM (Asynchronous Transfer Mode) exchanges, or IP (Internet Protocol) or towards other higher-order SDH Digital Cross-Connects, for instance of known type 4/3/1.

Figure 3:
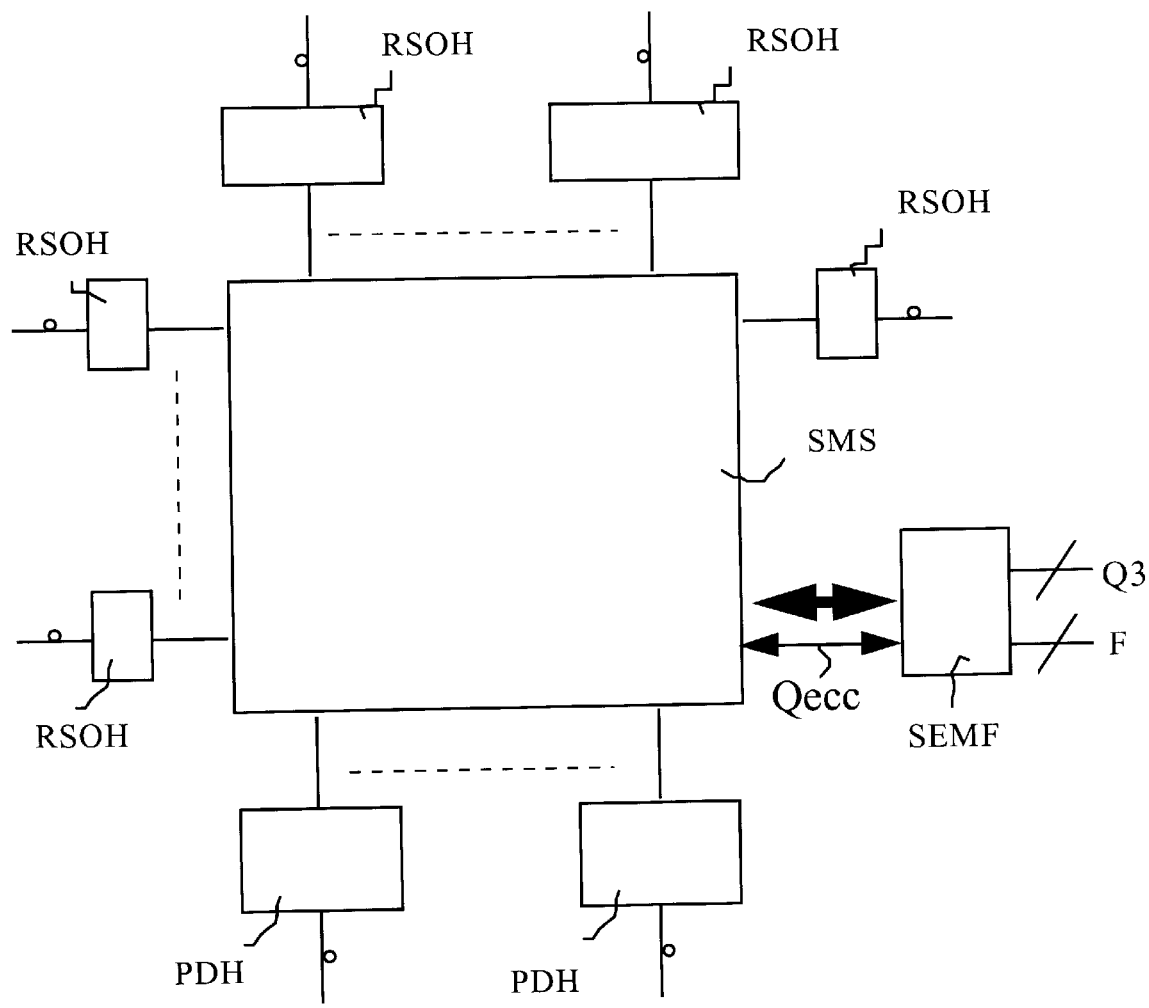
FIG. 3 shows a schematic block diagram implementing the MS-DXC block of FIG. 2.

FIG. 3 shows an embodiment of the digital cross-connect MS-DXC of FIG. 2.

It consists of a known space-type, high-speed electrical switching matrix SMS connected to which are:

SDH interfaces for the partial termination of the RSOH portion of the SDH frames for implementing the networking functionality;

a management block SEMF performing the known Synchronous Equipment Management Function, to which the known interfaces Qecc, Q3 (Management Interface) and F (Craft Terminal Interface) are in turn connected. SEMF provides and controls the correct pass-through of the frames in the node; and PDH interfaces for passing through of possible PDH frames at a bit-rate of 140 or 565 Mb/s.

In accordance with the invention, the necessary termination functions are only the RSOH ones to allow the local termination of the corresponding SDH frame portion, and the implementation of the OAM&P functions, if so provisioned by the management system. The PDH interfaces make the related full PDH flow to pass through in a transparent way.

The other portions of the frame, i.e. payload PL and MSOH are not terminated and do not require the related termination functions as, on the contrary, would be required in known systems, and therefore they transparently pass-through towards the matrix SMS.

Moreover, by avoiding the use of optical cross-connects, one avoids the addition of further overhead information on the related optical wavelengths, which would be necessary for allowing the entire STM-N frame to pass-through in a transparent way.

From the above description of the invention, combined with references to the already known circuital and method aspects, the person skilled in the art is able to carry out the invention.

Variations and modifications of the present invention should be apparent to those skilled in the art without departing from the scope of the present invention as defined by the attached claims.

I claim:

1. A frame transport method for use at the nodes of a synchronous digital hierarchy network, comprising:

receiving, at one of the nodes, a synchronous hierarchy high-bit rate signal frame, the frame having an overhead section and a payload section, the overhead section including a regeneration section overhead and a multiplex section overhead;

carrying out payload section transport such that the payload section is passed through the node without being terminated;

passing the multiplex section overhead of the frame through the node in a manner free of local reprocessing operations including reading, processing, and rewriting of the data of the multiplex section overhead; and passing at least part of the regeneration section overhead of the frame through the node in a manner free of local reprocessing operations including processing and rewriting of the at least part of the regeneration section overhead.

2. The method according to claim 1, wherein only a part of the regeneration section overhead of the frame is passed through the node in the manner free of processing and rewriting, and wherein only another part of the regeneration section overhead of the frame is locally read out and processed.

3. The method according to claim 1, wherein the whole regeneration section overhead of the frame is passed through the node in the manner free of local reprocessing operations including processing and rewriting.

4. The method according to claim 1, wherein:
the frame includes a field, in the regeneration section overhead, for performing a tracing out function to check and identify single channel system optical ports; and
the field is read out and passed through the node without being rewritten.

5. The method according to claim 1, wherein:
the frame includes a field, in the regeneration section overhead, for performing a connection error rate checking function to monitor performance; and
the field is read out and passed through the node without being rewritten.

6. The method according to claim 1, wherein:
the frame includes a field, in the regeneration section overhead, for implementing management functions;
using the field to implement an integrated data communication network between the network nodes and a management system, by reading out the field and then rewriting the field prior to passing the frame out of the node.

7. A device for use in improving the flexibility, the transparency and the network management in high-speed frame transport at the nodes of a synchronous digital hierarchy network, said high-speed frame including an overhead section and a payload section, the overhead section having a regeneration section overhead and a multiplex section overhead, said device comprising:

high capacity WDM and SDH terminals for high speed traffic management;
interfaces for local traffic management;
a non-blocking multiplex section digital cross-connect; and
said SDH terminals and said interfaces being connected to said cross-connect so that:
the payload is section passed through the node without being terminated;
the multiplex section overhead of the frame passes through the node in a manner free of local reprocessing operations including reading, processing, and rewriting of the data of the multiplex section overhead; and
at least part of the regeneration section overhead of the frame passes through the node in a manner free of local reprocessing operations including processing and rewriting of the at least part of the regeneration section overhead.

8. The device according to claim 7, wherein said non-blocking multiplex section digital cross-connect comprises a high-speed space-type electrical switching matrix.

9. The device according to claim 8, wherein, connected to said non-blocking multiplex section digital cross-connect are:
first interfaces, for local read out and processing of only a portion of said regeneration section, providing in said nodes a full or partial networking functionality of the operation, administration, maintenance and provisioning type;
second interfaces implementing plesiochronous frame pass-through in a transparent way; and
a management block providing and controlling the correct frame pass-through in said nodes.

* * * * *